J. P. FERRITER.
TELEPHONE TRANSMITTER.
APPLICATION FILED SEPT. 20, 1916.
1,234,649.
Patented July 24, 1917.
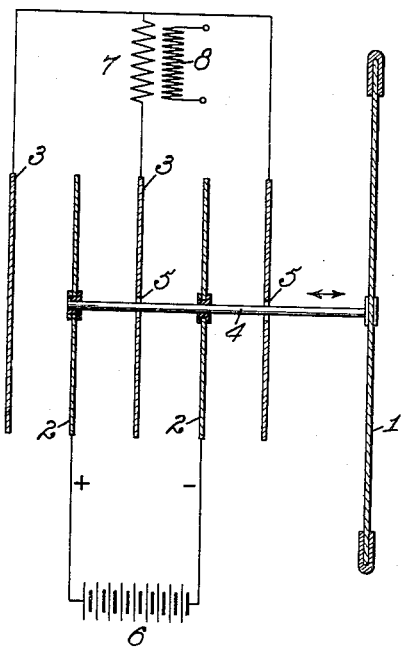
WITNESSES
Frederick Diehl.
C. Bradway.
INVENTOR
J. P. Ferriter
BY Munn & Co.
ATTORNEYS

UNITED STATES PATENT OFFICE.

JOHN PATRICK FERRITER, OF JACKSONVILLE, FLORIDA, ASSIGNOR OF ONE-HALF TO THOMAS J. PETERS, OF PETERS, FLORIDA.

TELEPHONE-TRANSMITTER.

1,234,649.  Specification of Letters Patent.  Patented July 24, 1917.

Application filed September 20, 1916. Serial No. 121,141.

*To all whom it may concern:*

Be it known that I, JOHN P. FERRITER, a citizen of the United States, and a resident of Jacksonville, in the county of Duval and State of Florida, have invented a new and Improved Telephone-Transmitter, of which the following is a full, clear, and exact description.

This invention relates to telephone transmitters, and it has for its general object to improve the construction and operation of devices of this character so as to be reliable and efficient in use and permit of a greater variation in the strength of the current passing through the induction coil of the telephone circuit.

A more specific object of the invention is the provision of a transmitter in which alternating current is produced in the primary circuit through the agency of a condenser, one set of plates of which is connected with the diaphragm of the transmitter in order to produce alternate positive and negative charges, resulting in the production of alternating current in the induction coil primary connected with the other set of plates of the condenser.

With such objects in view, and others which will appear as the description proceeds, the invention comprises various novel features of construction and arrangement of parts which will be set forth with particularity in the following description and claims appended hereto.

In the accompanying drawing, the figure is a diagrammatic sectional view of a telephone transmitter embodying the invention.

Referring to the drawing, 1 designates a diaphragm of suitable material and supported in any approved manner, and associated with the diaphragm is a condenser composed of separate sets of plates 2 and 3, the plates or elements 2 being mechanically connected with the diaphragm 1 by a rod or equivalent connection 4 which passes through openings 5 in certain of the elements 3 and which is insulated from the condenser elements 2. Normally the condenser elements 2 are midway between adjacent condenser elements 3, which are stationary, and consequently when the diaphragm vibrates the elements 2 move back and forth with respect to the elements 3. A battery or other source of continuous current 6 has its positive terminal connected with one of the plates 2 and the negative terminal connected with the other plate 2. If a plurality of movable plates are employed, alternate plates will be connected with the same terminal of the battery. The stationary plates are connected with a primary circuit in which is included the primary winding 7 of an induction coil. One terminal of this induction coil is connected with alternate fixed plates 3, and the other terminal is connected with the other plates 3. The secondary winding 8 is connected in the usual manner with the lines of a telephone system.

In use the diaphragm 1 vibrates in the usual manner. This causes a corresponding vibration of the movable plates of the condenser, whereby they induce alternate positive and negative charges in their corresponding fixed plates. These charges set up alternating currents in the primary winding of the induction coil which are sent over the main line through the secondary winding.

The advantages of this type of transmitter over others are:

(1) A uniform gradation of the electrical vibration set up, which insures perfect articulation.

(2) An increased transmission limit of a telephone line by reason of the corresponding ease of distinguishing between apparently similar sounds.

(3) Adaptability to any applied voltage without injury to the transmitter and without impairing the quality of the sound by heavy current passing therethrough.

(4) Its adaptability for use as a telephone repeater without the necessity for supervision of the repeater, since the transmitter is non-heating in action.

(5) No current flows through the transmitter under normal conditions, and only when the diaphragm is actually in vibration.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A telephone transmitter comprising a diaphragm, a condenser having relatively movable elements, the movable elements being mechanically connected with the diaphragm, a source of continuous current having its poles connected with the respective movable elements, and an induction coil having its terminals connected with the respective fixed elements.

2. A telephone transmitter comprising a diaphragm, a condenser having a set of fixed plates and a set of movable plates alternately arranged, means for connecting the movable plates with the diaphragm, a source of continuous current having its positive terminal connected with alternate movable plates and its negative terminal connected with the remaining plate or plates, and an induction coil having one terminal connected with alternate fixed plates and the other terminal connected with the remaining fixed plate or plates, whereby the movement of the movable plates produces positive and negative charges on the fixed plates, and consequent alternating current in the primary and secondary of the coil.

3. A transmitter including a diaphragm, a condenser comprising a set of fixed plates and a set of movable plates, a member mechanically connected with and insulated from the movable plates and also connected with the diaphragm, a source of current having one terminal connected with one movable plate and the other terminal connected with the other movable plate, an induction coil, primary windings having a terminal connected with one fixed plate and the other terminal connected with the other fixed plate or plates, said movable plates being normally midway between the fixed plates.

JOHN PATRICK FERRITER.